May 10, 1949.　　　　　J. J. FETSKO, JR　　　　2,469,874
GAUGE SUPPORT

Filed Jan. 7, 1944　　　　　　　　　　　　　2 Sheets-Sheet 1

WITNESSES:

INVENTOR
JOHN J. FETSKO, JR.
BY
HIS ATTORNEYS.

May 10, 1949. J. J. FETSKO, JR 2,469,874
GAUGE SUPPORT
Filed Jan. 7, 1944 2 Sheets-Sheet 2
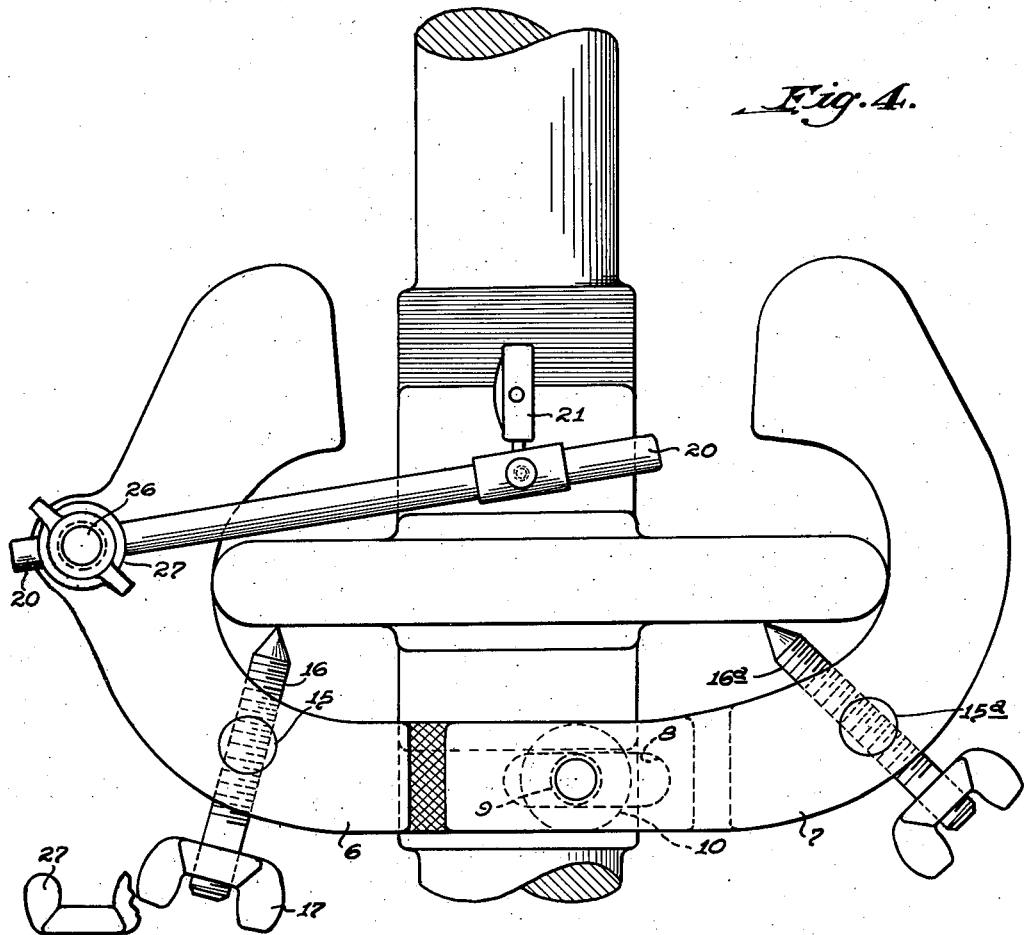
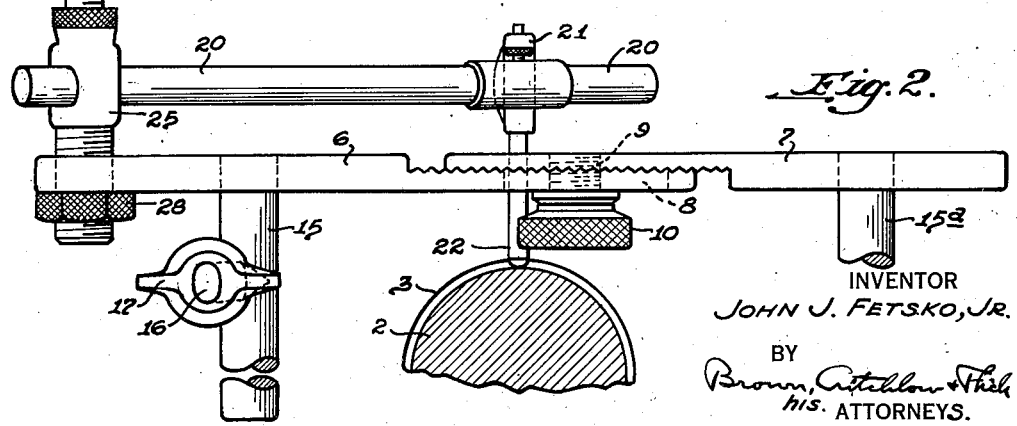
INVENTOR
JOHN J. FETSKO, JR.
BY
his ATTORNEYS.

Patented May 10, 1949

2,469,874

UNITED STATES PATENT OFFICE 2,469,874

GAUGE SUPPORT

John J. Fetsko, Jr., Neville Island, Pa.

Application January 7, 1944, Serial No. 517,303

5 Claims. (Cl. 248—226)

The invention relates to apparatus for testing the bearing clearances between the crank shaft of an internal combustion engine and the connecting rods attached to it, particularly such bearings in large gas and Diesel engines.

When connecting rod bearings are applied in either a new or a used engine of this type it is desirable to determine the initial clearance between the bearings and the crank shaft, and from time to time when such engines are idle it is desirable to test the clearance of such bearings to determine when shim adjustments are necessary and when new bearings are required before harmful consequences ensue.

An object of this invention is to provide a simple and compact apparatus for testing the clearance of these bearings, which may be quickly applied and removed, and which may be used in short periods of time accurately to determine bearing clearances.

Figure 1:
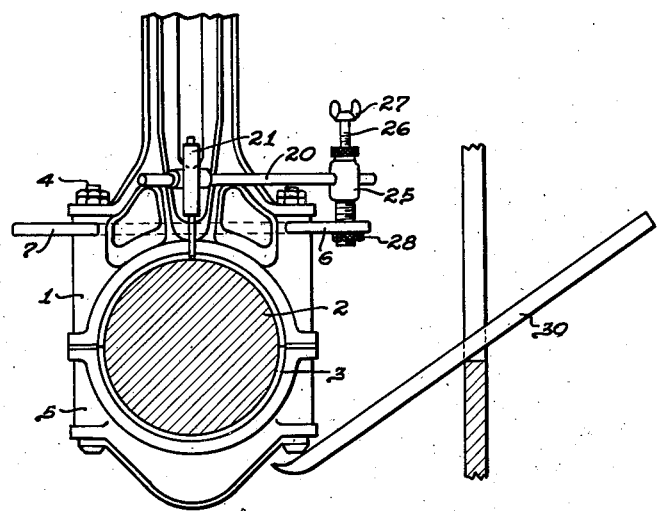
Figure 3:
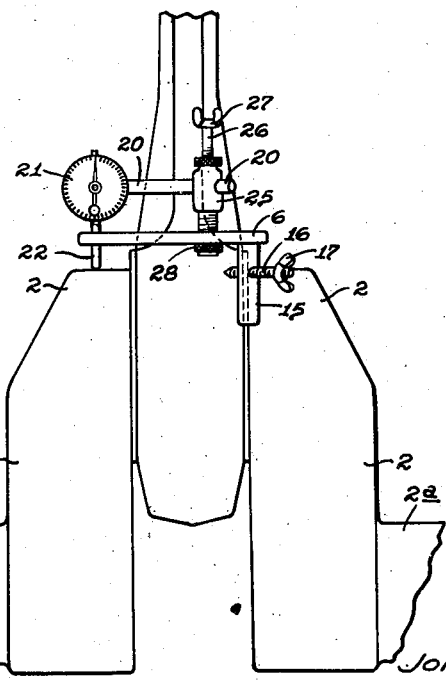

The invention is illustrated in the accompanying drawings of which Figs. 1 and 2 are transverse sectional views of a crank shaft and opposite mace views of the lower portion of a connecting rod attached to it, the connecting rod having the preferred form of my bearings testing apparatus applied to it; Fig. 3 a right side elevation of the structure shown in Fig. 1; and Fig. 4 a plan view thereof.

Having reference to the drawings, the lower portion or yoke of a connecting rod 1 is shown attached to a crank arm 2 of a crank shaft 2a, there being a cylindrical sliding bearing 3 between the shaft and rod. The connecting rod is attached to the crank shaft by bolts 4 which extend through the rod and engage a pillow block 5. The testing apparatus here provided comprises a hook-like clamp formed to engage opposite sides of the connecting rod. As shown in the drawings, particularly in Figs. 2 and 4, the clamp consists of two plate-like arms 6 and 7 whose adjacent ends overlap and whose contacting faces are roughened. The end of arm 6 is provided with a slot 8 and the overlapping end of arm 7 with a screw 9 which extends through slot 8 and is provided with a knurled head 10. The two arms form an extensible C-clamp adapted to engage the opposite sides of the lower end of a connecting rod. When the curved ends of the arms are placed around the sides of the rod and arms are pressed toward each other and screw 9 is tightened to hold the arms together, this being facilitated by the roughening of their mutually contacting faces.

To fix the clamp rigidly upon the rod the clamp is provided with one or more grippers which are movable to engage the side of the rod above or below the plane of the clamp. As shown in the drawings, clamp arm 6 is provided with a depending pin 15 which is rigidly attached to the arm and which is provided with a threaded opening to receive a set screw 16 having a wing head 17 for turning it by hand. The front end of screw 16 may be provided with a point to grip the side of the connecting rod. Arm 7 is similarly provided with a depending pin 15a and a pointed set screw 16a. By tightening these set screws after the clamp is applied to a connecting rod the clamp is rigidly held in its attached position.

One arm of the clamp is provided with a support in the form of a rod 20, to the outer end of which there is suitably attached a gage 21 of the well known dial type for indicating relative movement between bodies. What is known as an Ames gage is shown in the drawings, the gage having a dial at whose center there is pivoted a hand adapted to be rotated by movements of a pin 22 towards and from the center of the gage. The other end of supporting rod 20 is adjustably attached to the top of clamp arm 6 so that after the clamp is applied to a connecting rod the gage may be moved to position its pin 22 in contact with the top of a crank arm 2 which is then in its uppermost position. As shown in the drawings, the end of rod 20 extends through a smooth bore formed in the upper end of a post 25 which is threaded to engage threads in arm 6. When properly adjusted longitudinally in the bore of post 25, rod 20 is held firmly by a set screw 26 which is provided with a wing head 27 for turning it. Post 25 may be vertically adjusted by rotating it in arm 6, and when in its desired vertical position it is held against turning by means of a knurled nut 28 which is threaded upon the lower end of the post and engages the lower face of arm 6.

In using the apparatus to test a bearing, the arms 6 and 7 of the clamp are first applied to the lower end of a connecting rod 1, and when they are pulled together they are tightened by turning the knurled head 10 of screw 9. Thereafter, set screws 16 and 16a are tightened for fixing the clamp rigidly upon the connecting rod. Post 25 is then vertically adjusted to the desired height by rotating it, after which knurled nut 28 is tightened to hold it in position. Rod 20 is then moved longitudinally in post 25 to so position the gage in contact with the crank arm 2 so that pin 22 of the gage is pressed inwardly of the gage a substantial amount. Thereafter a bar 30 is inserted through the door opening of the crank casing, and its lowered end positioned below block 5 of the connecting rod. By pressing the outer end of bar 30 downwardly, using the edge of the door opening in crank casing as a fulcrum, the connecting rod is moved upwardly as much as possible, the amount of such movement depending upon the clearance between the crank shaft and connecting rod bearing 3. This movement is indicated by the movement of the dial on the gage 21, it being understood that the upward movement of the connecting rod by bar 30 elevates the testing apparatus and the gage supported by it a distance equal to the clearance between the connecting rod and crank shaft. The several connecting rod bearings of an engine may be thus tested in succession, in a comparatively short space of time, and such testing may be done by one person.

According to the provisions of the patent statutes, I have explained the principle of my invention and have illustrated and described what I now consider to represent its best embodiment. However, I desire to have it understood that, within the scope of the appended claims, the invention may be practiced otherwise than specifically illustrated and described.

I claim:

1. A support for a gage for testing bearings between a crank shaft and a conecting rod attached to it, comprising an extensible clamp formed of a pair of plates adjustably connected to each other at their inner ends for relative longitudinal movements and each having a hook at its outer end formed to engage a side of the connecting rod, a gripper borne by one of said plates outside of a plane passing through their said hooks and movable to engage the connecting rod for fixing the clamp rigidly thereon, a post attached to the clamp for vertical and angular adjustment with relation thereto, and a gage-supporting rod firmly attached to said post for longitudinal adjustment with relation thereto.

2. A support for a gage for testing bearings between a crank shaft and a connecting rod attached to it, comprising an extensible clamp formed of a pair of plates adjustably connected to each other at their inner ends for relative pivotal and longitudinal movements and each having a hook at its outer end formed to engage a side of the connecting rod, means for firmly clamping said plates to each other in their relatively pivoted and longitudinally adjusted positions, grippers borne by and extending downwardly from said plates outside of a plane passing through their said hooks and movable to engage the connecting rod for fixing the clamp rigidly thereon, a post extending upwardly from the clamp and firmly attached to it for vertical and angular adjustment, and a gage-supporting rod firmly attached to said post for longitudinal adjustment with relation thereto.

3. A support for a gage for testing bearings between a crank shaft and a connecting rod attached to it, comprising an extensible clamp formed of a pair of plates each having a hook at its outer end for engaging a side of a connecting rod, a set screw connecting the inner ends of said plates to each other for relative pivotal and longitudinal movements, means for firmly clamping said plates to each other in their relatively pivoted and longitudinally adjusted positions, a gripper borne by one of said plates outside of a plane passing through their said hooks and movable to engage the connecting rod for fixing the clamp rigidly thereon, a post firmly attached to the clamp for vertical and angular adjustment with relation thereto, and a gage-supporting rod firmly attached to said post for longitudinal adjustment with relation thereto.

4. A support for a gage for testing bearings between a crank shaft and a connecting rod attached to it, comprising an extensible clamp formed of a pair of plates each having a hook at its outer end for engaging a side of a connecting rod, the inner end of one of said plates being provided with a slot and the inner end of the other being provided with a set screw for connecting the plates to each other for relative pivotal and longitudinal movements, means for firmly clamping said plates to each other in their relatively pivoted and longitudinally adjusted positions, grippers extending downwardly from and borne by said plates to engage the connecting rod for fixing the clamp rigidly thereon, a post extending upwardly from the clamp and firmly attached to it for vertical and angular adjustment, and a gage-supporting rod firmly attached to said post for longitudinal adjustment with relation thereto.

5. A support for a gage for testing bearings between a crank shaft and a connecting rod attached to it, comprising an extensible clamp formed of a pair of plates adjustably connected to each other at their inner ends for relative longitudinal movements and each having a hook at its outer end formed to engage a side of a connecting rod, a rod attached to and extending downwardly from each of said plates below a plane passing through them and provided at its lower end with a set screw for engaging the connecting rod and fixing the clamp rigidly thereon, a post extending upwardly from the clamp and firmly attached to it for vertical and angular adjustment, and a gage-supporting rod firmly attached to said post for longitudinal adjustment with relation thereto.

JOHN J. FETSKO, JR.

REFERENCES CITED

The following references are of record in the file of this patent:

UNITED STATES PATENTS

| Number | Name | Date |
| --- | --- | --- |
| 320,941 | Macomber | June 30, 1885 |
| 470,102 | Canby | Mar. 1, 1892 |
| 935,730 | Bacon | Oct. 5, 1909 |
| 968,884 | Reisner et al. | Aug. 30, 1910 |
| 989,808 | Rockwood et al. | Apr. 18, 1911 |
| 1,047,511 | Freeman | Dec. 17, 1912 |
| 1,523,597 | Lang | Jan. 20, 1925 |
| 1,670,902 | Popps | May 22, 1928 |
| 1,888,454 | Edson | Nov. 22, 1932 |
| 2,214,006 | Parker | July 19, 1938 |

FOREIGN PATENTS

| Number | Country | Date |
| --- | --- | --- |
| 547,581 | Great Britain | Sept. 2, 1942 |